United States Patent [19]

Maitino et al.

[11] Patent Number: 5,057,202
[45] Date of Patent: Oct. 15, 1991

[54] ELECTROLYTIC RECOVERY UNIT

[76] Inventors: Phillip M. Maitino, 2816 Ingleside Dr., Parma, Ohio 44134; Eugene J. Maitino, 894 Circlewood Dr., Aurora, Ohio 44202

[21] Appl. No.: 550,311

[22] Filed: Jul. 9, 1990

[51] Int. Cl.$^5$ ............... C25D 17/00; C25D 17/20; C25D 21/06
[52] U.S. Cl. ............... 204/212; 204/213; 204/238; 204/275; 204/276; 204/284
[58] Field of Search ............... 204/212–213, 204/275–276, 287, 284, 238

[56] References Cited

U.S. PATENT DOCUMENTS

| | | | |
|---|---|---|---|
| 2,673,076 | 3/1954 | Colclesser | 204/213 X |
| 2,766,201 | 10/1956 | Luther | 204/287 X |
| 4,715,934 | 12/1987 | Tamminen | 204/212 X |

Primary Examiner—Donald R. Valentine
Attorney, Agent, or Firm—Fay, Sharpe, Beall, Fagan, Minnich & McKee

[57] ABSTRACT

An apparatus for recovering metals from waste metallic solutions includes a treatment tank and a hollow perforated cathode element rotatably mounted in the treatment tank for holding associated work pieces which are to be coated with the recovered waste metal. A fixed anode element extends in the treatment tank in spaced relation to the rotatable cathode element. A first solution inlet conduit extends into the rotatable cathode element. A second solution inlet conduit extends into the treatment tank in a spaced manner from the rotatably cathode element. A drain conduit leads away from the treatment tank.

22 Claims, 6 Drawing Sheets

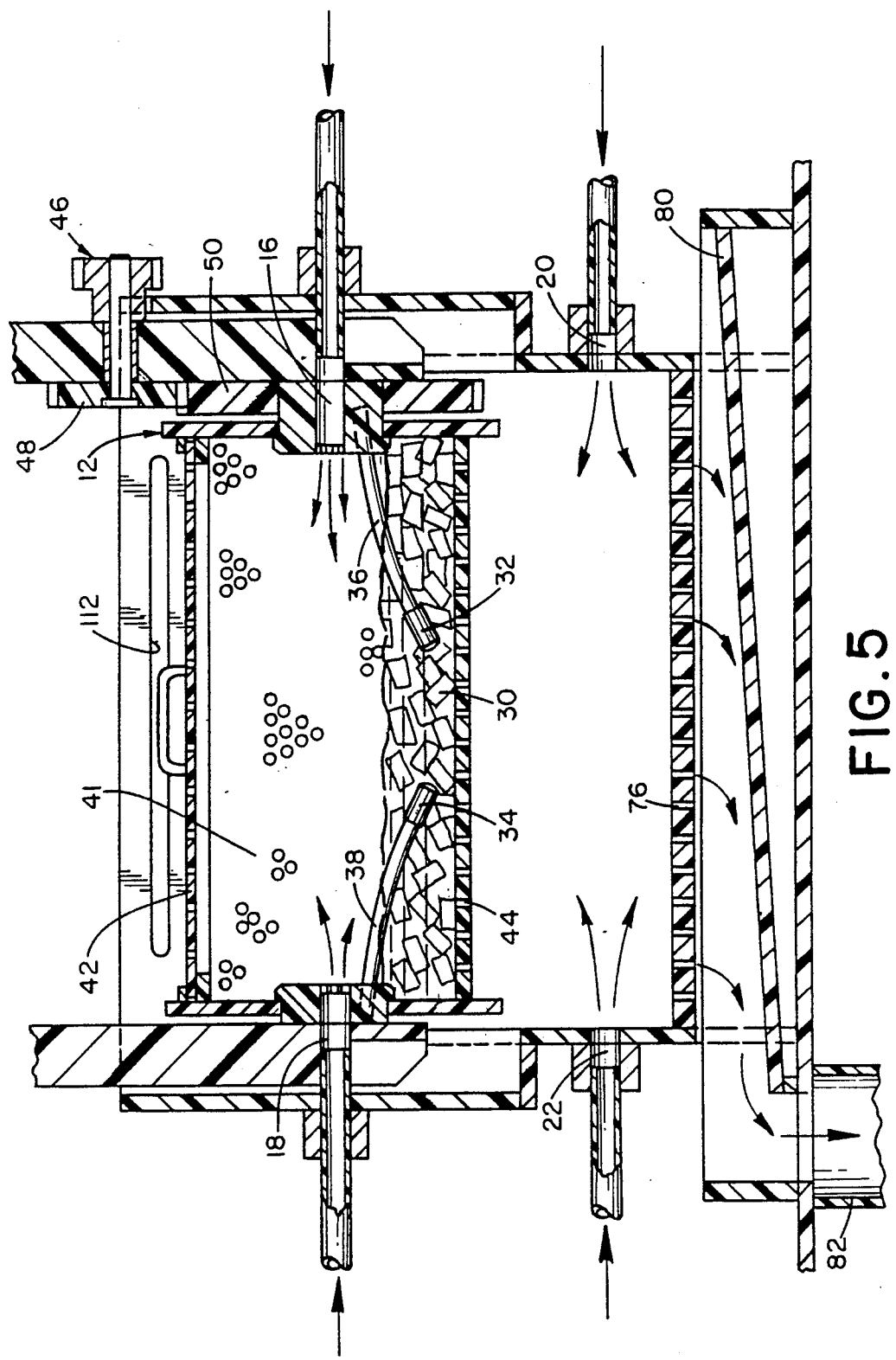

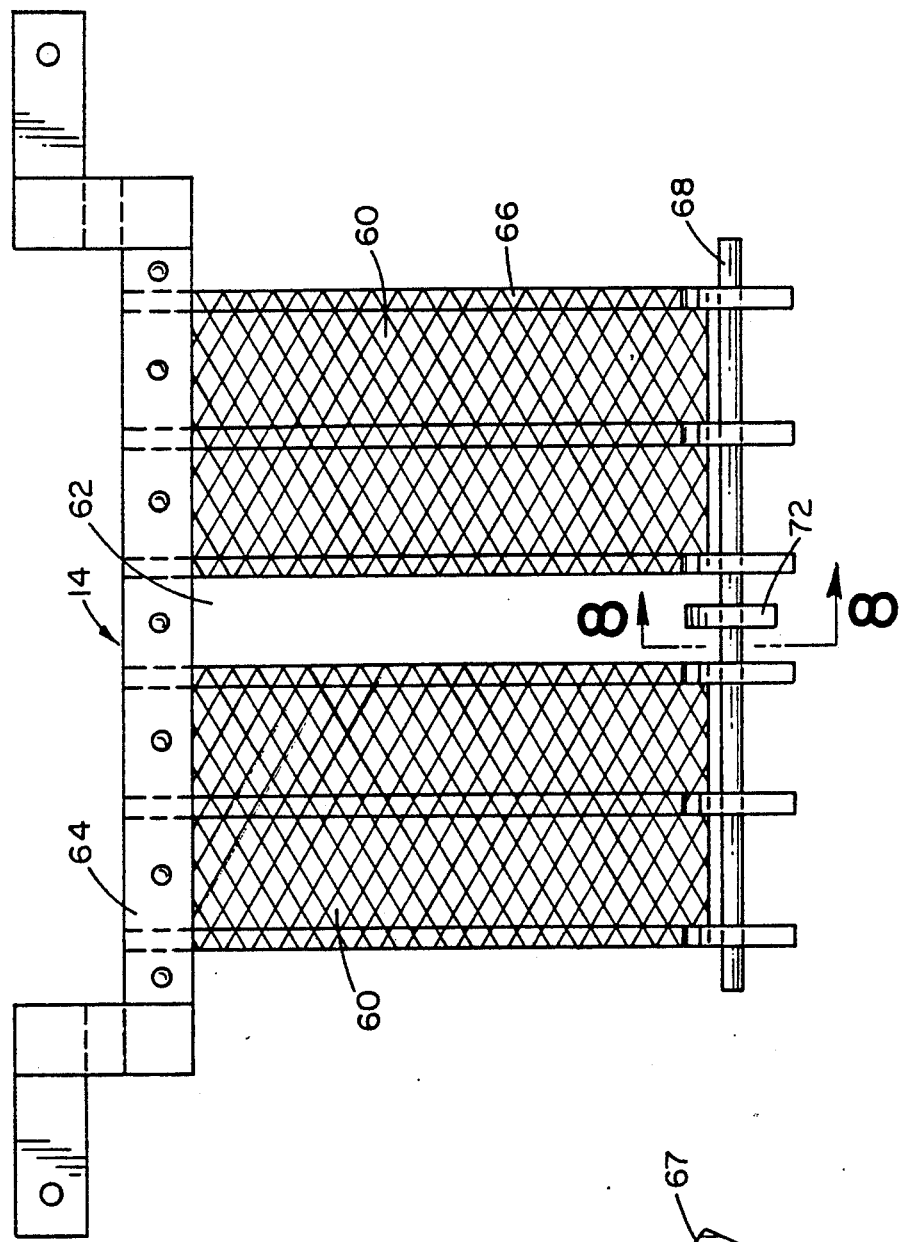
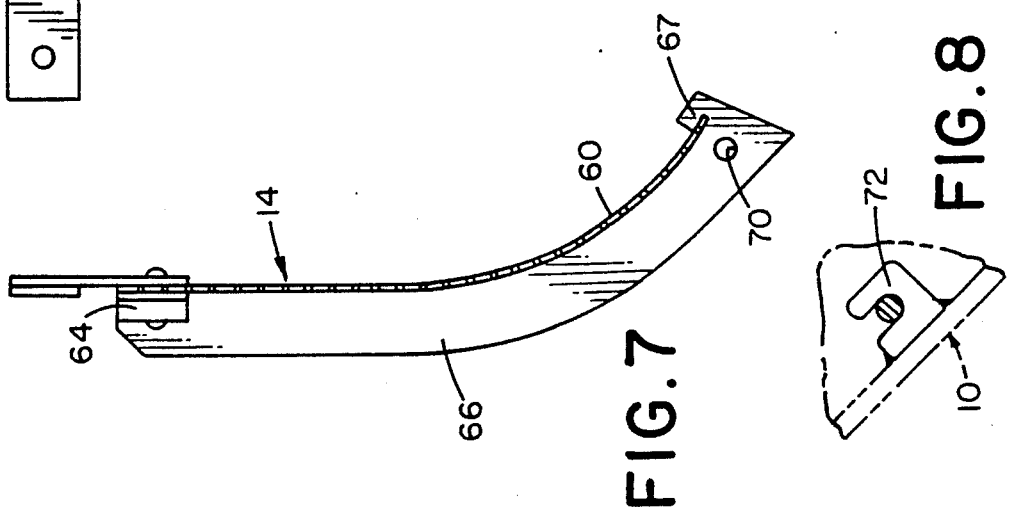

ELECTROLYTIC RECOVERY UNIT

BACKGROUND OF THE INVENTION

This invention relates generally to environmental cleansing apparatus. More particularly, the present invention relates to an apparatus for recovering metal from waste metallic solutions.

The disposal of solutions which contain a waste metal is a difficult problem since pollution ordinances in most municipalities forbid the direct dumping of the waste metallic solution into the municipality's sewer system. Various types of apparatus are known for removing metal from waste metallic solutions. These include electrolytic recovery systems, electrolytic metal recovery cells and electroless bath treatment cells, as well as various metal winning modules. However, all of these types of apparatuses are quite expensive to construct and maintain and are therefore uneconomical.

More specifically, the present invention is concerned with an electrowinning apparatus. As is known, electrowinning involves the production of metals by electrolysis, through the use of insoluble anodes, from metallic solutions or other solutions containing ores or other types of metals. It would be desirable to provide such electrowinning units with an extended life and reduced maintenance. It would also be desirable if such units were modular in nature, for ease of capacity expansion when necessary, while also being easy to maintain. It would further be desirable to provide a system allowing an extremely high rate of metal recovery as well as a high capacity plate out which could rapidly remove metals from a process solution.

Accordingly, it has been considered desirable to develop a new and improved metal recovery device for waste metallic solutions which would overcome the foregoing difficulties and others and meet the above-stated objectives while providing better and more advantageous overall results.

BRIEF SUMMARY OF THE INVENTION

In accordance with the present invention, an apparatus is provided for recovering metals from waste metallic solutions.

In accordance with this aspect of the invention, the apparatus comprises treatment tank and a hollow perforated cathode element rotatably mounted in the treatment tank for holding the associated work pieces which are to be coated with the recovered waste metal. A fixed anode element extends in the treatment tank in spaced relation to the rotatable cathode element. A first solution inlet conduit extends into the rotatable cathode element and a second solution inlet conduit extends into the treatment tank in a spaced manner from the rotatable cathode element. A drain conduit leads away from the treatment tank.

According to another aspect of the present invention, an apparatus is provided for recovering metal from waste solutions containing metal.

More particularly in accordance with this aspect of the invention, the apparatus comprises a treatment tank for holding the waste solution and a plating barrel for holding associated workpieces onto which the metal will plate. The plating barrel is perforated and is rotatably mounted within the treatment tank. A cathode contact element extends into the plating barrel so as to contact the workpieces held therein. A fixed anode element extends in the treatment tank in spaced relation to the plating barrel. A first solution inlet conduit extends into the plating barrel and a second solution inlet conduit extends into the treatment tank in a spaced manner from the plating barrel. A circuit means is provided for connecting the anode and cathode to a source of electric current.

In accordance with still another aspect of the present invention, an apparatus is provided for recovering metal from waste solutions containing metal.

More particularly in connection with this aspect of the invention, the apparatus comprises an electrolyte tank and a perforated container holding associated workpieces which are to be coated. A means is provided for rotatably mounting the container in the tank. A cathode contact element extends into the container for contacting the workpieces. A first electrolyte circulating pipe extends into the container. An anode element extends into the tank in spaced relation to the container. A plurality of drain holes are located at the bottom of the electrolyte tank. A drain conduit leads away from the electrolyte tank and a sloping drain gutter is located under the drain holes and leads to the drain conduit.

One advantage of the present invention is the provision of a new and improved waste metal recovery apparatus.

Another advantage of the present invention is the provision of a waste metal recovery apparatus including a rotatable cathode and fixed anodes.

Still another advantage of the present invention is the provision of a waste metal recovery apparatus in which the waste solution enters both a rotating cathode element as well as the treatment tank, in a manner spaced from the cathode element.

Yet another advantage of the present invention is the provision of J-shaped anode elements made of a wire grid material that is clad with precious metal to extend anode life.

Still yet another advantage of the present invention is the provision of a waste metal recovery apparatus which has a high mass transfer design in order to enhance the removal of metal from both concentrated solutions of up to 20,000 parts per million, and diffuse solutions, of approximately 10 parts per million.

A further advantage of the present invention is the provision of a waste metal recovery apparatus that has self-cleaning features.

A still further advantage of the present invention is the provision of a waste metal recovery apparatus which allows a high yield of metal from a solution at low overall operating costs.

A yet further advantage invention is the provision of a waste metal recovery system which is compact in design and which is modular in nature in order to allow expansion.

A still yet further advantage of the present invention is the provision of a waste metal recovery system which has a load and unload station for the plating media, as well as a rinsing station for cleaning the plating media.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 5 is an enlarged cross sectional view through the cell of FIG. 4;

FIG. 6 is a side elevational view through an anode extending in the cell of FIG. 4;

FIG. 7 is an enlarged side elevational view of the anode of FIG. 6; and,

FIG. 8 is an enlarged side elevational view through a portion of FIG. 6 along line 8—8.

DETAILED DESCRIPTION OF A PREFERRED EMBODIMENT

Figure 1:
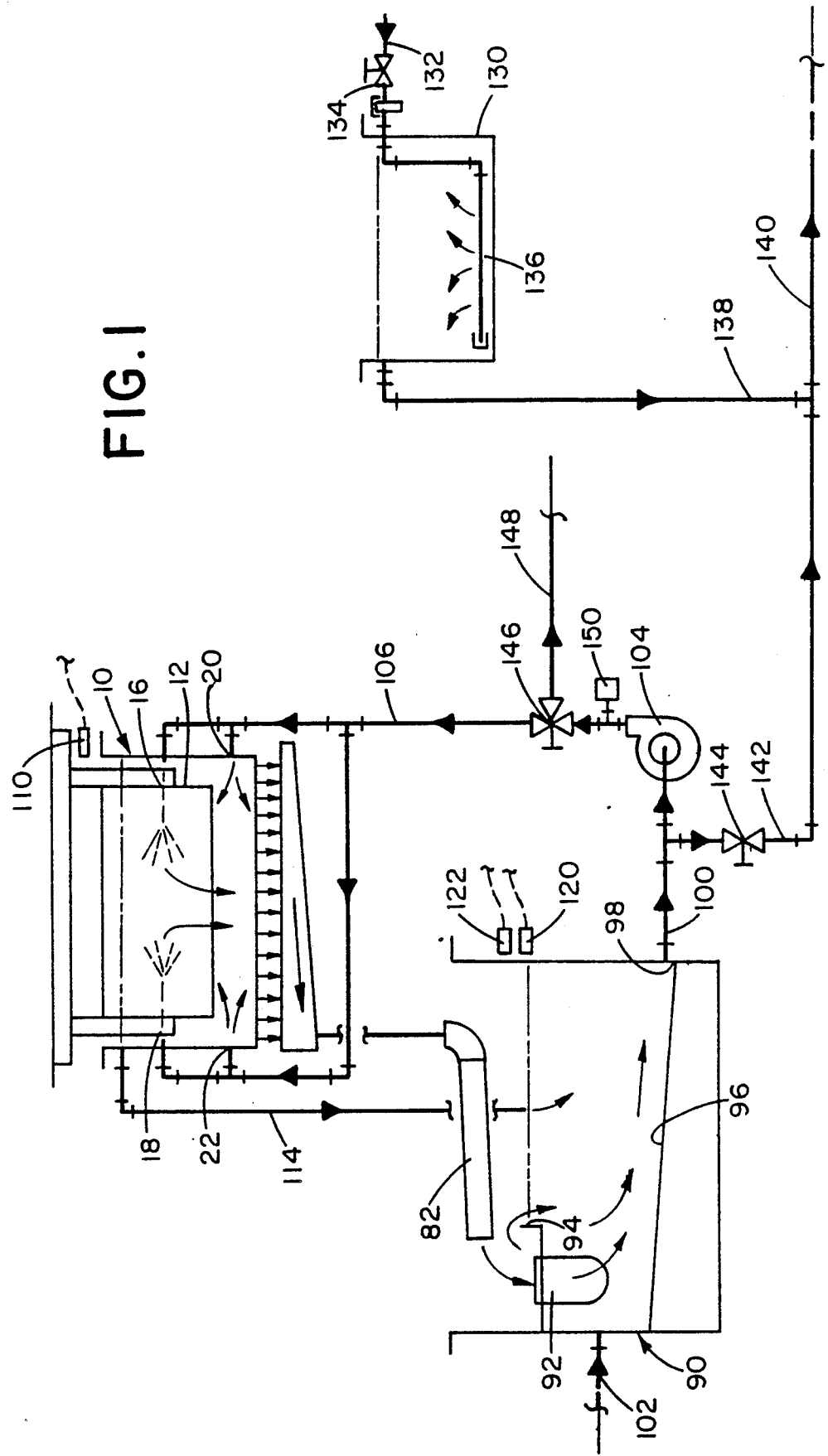
FIG. 1 is schematic view of an apparatus for recovering metals from waste metallic solutions according to a preferred embodiment of the present invention.

Referring now to the drawings, wherein the showings are for purposes of illustrating a preferred embodiment of the invention only and not for purposes of limiting same, FIG. 1 shows a schematic diagram of the apparatus for recovering metals from waste metallic solutions. While the apparatus is primarily designed for and will hereinafter be described in connection with the recovery of common metals such as nickel, copper and lead, from plated out or waste metallic solutions, it should be appreciated that the overall inventive concept involved could be adapted for use in other metal recovery environments as well. For example, the apparatus can also be used for treating process solutions, rinse water, segregated sludges, regenerant solutions, bath dumps and decants or electroless solutions. Such solutions can be cyanide, acid sulfate, alkaline, fluoborate, or, as mentioned, electroless. In addition to recovering nickel, copper and lead, the apparatus can also be used to recover precious metals such as gold and silver as well as other common metals such as tin and zinc.

Figure 3:
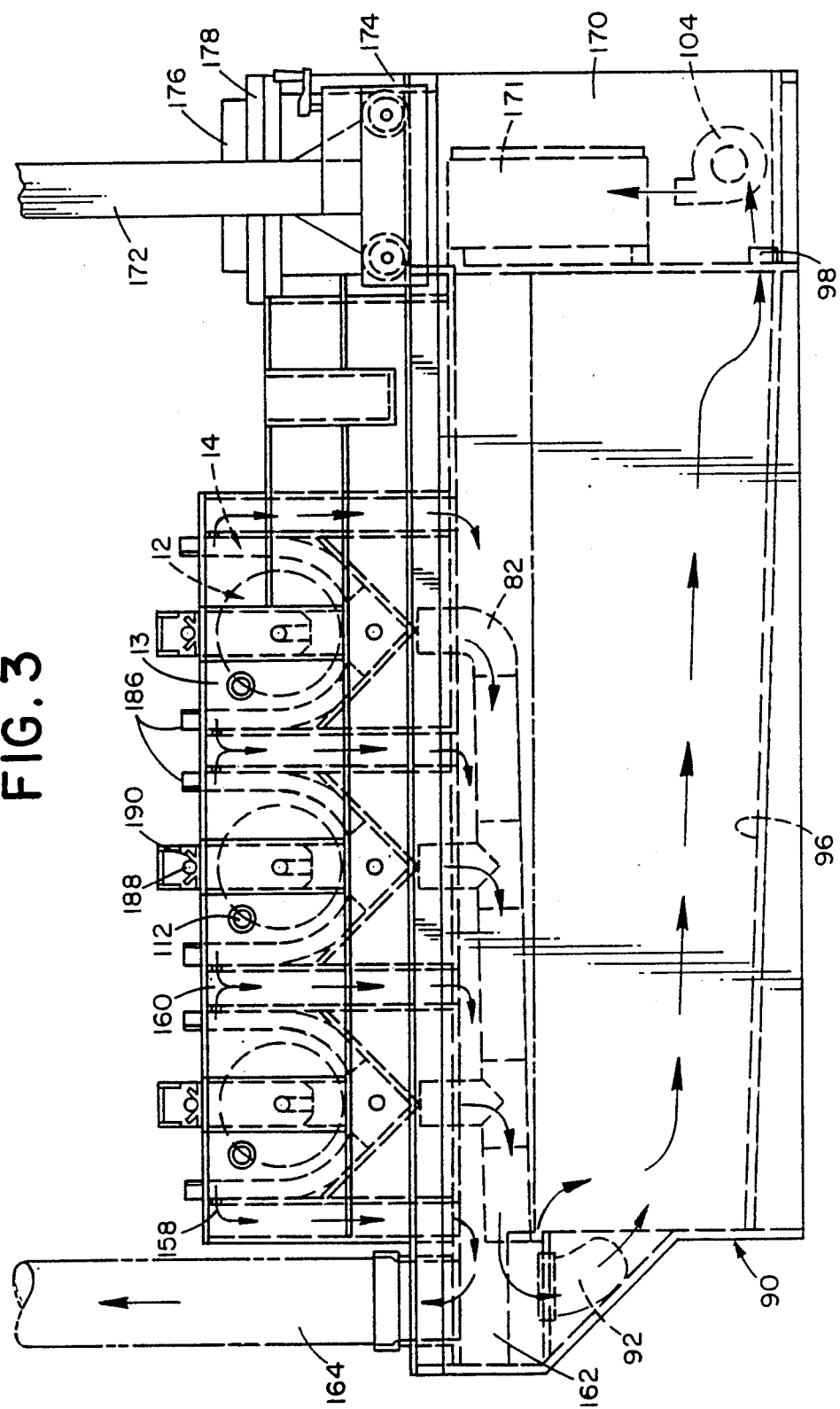
FIG. 3 is a side elevational view of the apparatus of FIG. 2.

With reference to FIG. 1, a treatment tank 10 has rotatably mounted therein a cathode barrel 12. As shown in FIG. 3, a number of adjacent cathode barrels 12 can be located in separate cells 13 that are formed in a large size treatment tank if so desired. Located adjacent each cathode barrel 12 are anode elements 14. With reference again to FIG. 1, extending through opposed ends of the cathode barrel 12 are first and second inlets 16 and 18 for feeding waste metallic solution into the cathode barrel. Positioned below the cathode barrel and extending into the tank 10 are third and fourth solution inlets 20 and 22.

With reference now also to FIG. 5 it can be seen that positioned in the cathode barrel 12, and filling the barrel approximately one-third full, is a medium 30 which may be metallic shot, nuts, bolts, or even metal covered plastic pellets. The provision of nugget-shaped elements for the medium is advantageous in that such nuggets are easy to handle and process for reclamation or reuse once they have been plated with the metal recovered from the solution. The medium 30 is charged negatively by a pair of spaced electric contact elements 32 and 34, each of which is held on a respective conductor rod 36 and 38.

The cathode barrel 12 is preferably made from a nonconducting material, for example a plastic such as polypropylene, is hollow and has an interior cavity 41 enclosed by walls and a lid 42. A plurality of perforations 44 in the barrel side walls allow solution to flow out therethrough as the barrel rotates. In order to provide rotation for the barrel, a conventional drive means 46 is used including a first gear 48 and a second gear 50, that is fixedly secured to the barrel. Preferably, the tank 10 is also made from a suitable plastic material, such as polypropylene.

Due to the use of a pair of facing inlet conduits 16 and 18 through the hubs of the cathode barrel 12, a turbulent flow is generated within the barrel. Such a turbulent flow through the medium 30 is advantageous in that it will scrub hydrogen atoms off the medium. Accordingly, one will avoid the potential of hydrogen embrittlement of the metal which is plated onto the medium.

Figure 4:
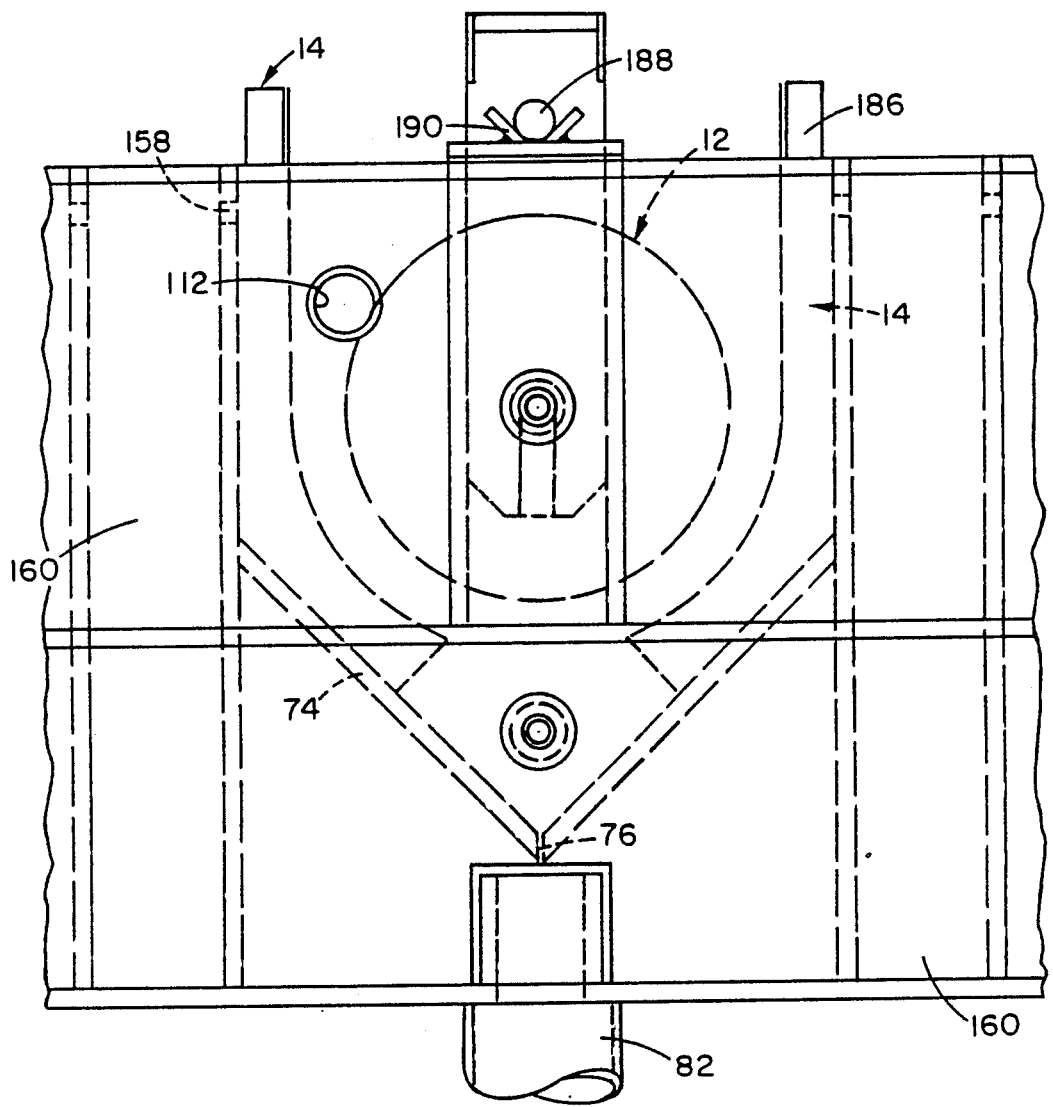
FIG. 4 is an enlarged side elevational view of one cell of the apparatus of FIG. 3.

As shown in FIG. 4, spaced from the cathode barrel 12 are the anode elements 14. Two such anode elements 14, which are preferably J-shaped and are provided one on either side of the cathode barrel 12. With reference now also to FIG. 6, each J-shaped anode 14 comprises a pair of wire grids 60 separated by a gap 62. In effect, therefore, four anodes are provided, two on each side of the barrel 12. The wire grids 60 are held in a frame which includes a horizontally extending top member 64 to which are secured a plurality of vertically extending ribs 66. As is evident from FIG. 7, the grids are supported by the vertical ribs 66 and are secured at each end to the ribs. At the top end, such a securing function is performed by the top frame member 64. At the bottom end, the securing function is performed by a lip portion 67 of the rib 66. The framing structure is held to the tank 10 by a tie bar 68 which extends through a set of suitable aligned apertures 70 in the ribs 66. The tie bar, in turn, is held in place on the tank wall by a hold down shoe 72 as is illustrated in FIG. 8.

Two anodes are provided on each side of the plating barrel for current distribution purposes. It has been determined by the applicant that a single anode does not allow the media to plate as fast as does the two anode configuration. Wire grids are advantageous for use as the anodes because of their flexibility in order to enable the anode to be readily contoured to the J-shape. The wire grid will hold that shape since it does not have a memory. In addition, the wire grids are somewhat less costly than would be a solid material anode. The anode is expected to be a platinum-clad niobium material which is meant to be a permanent anode. It is anticipated that this single anode composition should be adequate for use for most types of metal which are to be recovered from most types of waste metallic solutions. It is advantageous to have clad anodes rather than less reliable plated anodes since this will extend the life of the anode. The efficient anode placement and configuration disclosed herein reduces the number of anodes which are required and decreases anode replacement costs.

As is evident from FIG. 4, the tank has a pair of lower cell walls 74 which are angled towards each other. Defined between the walls 74 at an apex point are a plurality of perforations 76 that, perhaps, can be best seen in FIG. 5. These perforations allow the solution to flow out of the tank and into a drain gutter 80. As shown in FIG. 5, the drain gutter is sloped towards a drain pipe 82 so that the solution flowing through the perforations 76 will be guided into the drain pipe.

With reference now again to FIG. 1, the drain pipe 82 leads to a lower solution reservoir 90. Positioned at the entrance to the reservoir is a filter bag 92 held in a weir assembly 94. The solution is thereby filtered to remove suspended solids, metal fines and debris and the cleansed solution flows into the reservoir. It is noted that a lower reservoir wall 96 is sloped towards an outlet 98 which leads to an outlet pipe 100.

In fluid communication with the reservoir 90 is an inlet pipe 102 which is used to initially fill the reservoir with waste metallic solution that is meant to be cleansed by the apparatus. The outlet pipe 100 leads to a pump 104 which serves to pump the solution back into the tank 10 through a pipe 106 which communicates with the first, second, third and fourth inlets 16, 18, 20 and 22 in each cell 13. In this way, the solution can be recycled numerous times as it is being cleansed from its waste metal. Located adjacent each cathode cylinder 12 is a safety limit switch 110. These switches 110 allow the pump 104 to be activated only when the limit switches are in contact with the cathode cylinder 12 in each cell 13. Preferably all the safety limit switches are interlocked in series electrically. In this way, the pump 104 will not operate if one of the cylinders 12 is not correctly positioned in its cell 13 in the tank 10.

Should the solution in any of the cells 13 of the tank overflow, an overflow outlet 112 is provided on each cell of the tank. Such outlets 112 each lead to an overflow pipe 114 as is illustrated in FIG. 1. The pipe 114 in turn leads directly into the lower solution reservoir 90 from which the overflowing fluid can be pumped back into the treatment cells.

Provided adjacent the lower solution reservoir 90 is a first solution level sensor 120 which indicates the maximum process solution level in the lower solution reservoir 90. Located above the first sensor 120 is a second sensor 122 which will trigger a high solution level warning for the reservoir 90. Operating in a stand-alone mode, the sensor 120 will act as a minimum solution level sensor in the reservoir or sump 90. If the process solution does not rise to at least the level of the sensor 120, the sensor will shut off the system, i.e., disable the pump 104. Also, in the stand-alone mode, the sensor 122 will send a warning signal, either audible or visible or both, to a control panel where an operator will be able to see or hear it.

When the unit disclosed herein operates in conjunction with a conventional ion exchange unit (not illustrated), the second or high level sensor 122 will be capable of controlling the output to the ion exchange unit and shut the whole system down when a high level is sensed. When the unit is operated in conjunction with an ion exchange device, the first sensor 120 will act as a minimum level sensor and will shut the system down when the minimum level is not sensed.

In order to rinse the medium 30 that has been plated in the tank 10 through the electrowinning process, a rinse tank 130 is provided which is connected to a water source line 132, such as a city water line, through suitable valving 134. The water line leads to a water dispersion spider 136 provided at the bottom of the tank in order to rinse the medium. Water is then allowed to flow out of the rinse tank 130 through an outlet pipe 138 which leads to a drain line 140. In fluid connection with the outlet pipe 100 leading from the lower solution reservoir 90 is a drain line 142 which leads to the drain line 140. A suitable conventional control valve 144 is provided in the drain line 142. If desired, a conventional three-way valve 146 can be provided in the pipe 106 which can selectively allow flow from the pump 104 to a solution transfer line 148. However, it is not anticipated at this point that such a valve will be needed for most applications. When used, the solution transfer line could channel solution to an associated ion exchange unit or the like (not illustrated).

It is also noted that a pump cut-out switch 150 is in electrical contact with the pump 104 to selectively disable the pump, such as when the safety limit switches 110 indicate that one of the cathode barrels is not correctly placed in one of the cells. Also, the switch 150 could be tied in to one of the sensors 120 and 122.

Additionally provided for the apparatus, and with reference now to FIG. 3, is a conventional fume exhaust system including a pair of high velocity air slots 158 for uniform removal of gases and fumes that are produced during the electrowinning process. The fumes are ducted to hoods 160 located between the cells 13 and thence to an exhaust plenum 162. From there the fumes are led to an exhaust outlet 164.

The pump 104 is located in a mechanical and electrical compartment 170 in which is also housed a suitable electrical control panel 171 for the unit. Located above the compartment 170 is a suitable conventional rotating cylinder hoist 172 and a hoist guide rail 174 is located therebelow. When the cylinders or barrels are hoisted, a perforated media unload basket 176 is utilized. The basket is provided on a media unload drain board 178 that is secured adjacent the hoist 172.

Figure 2:
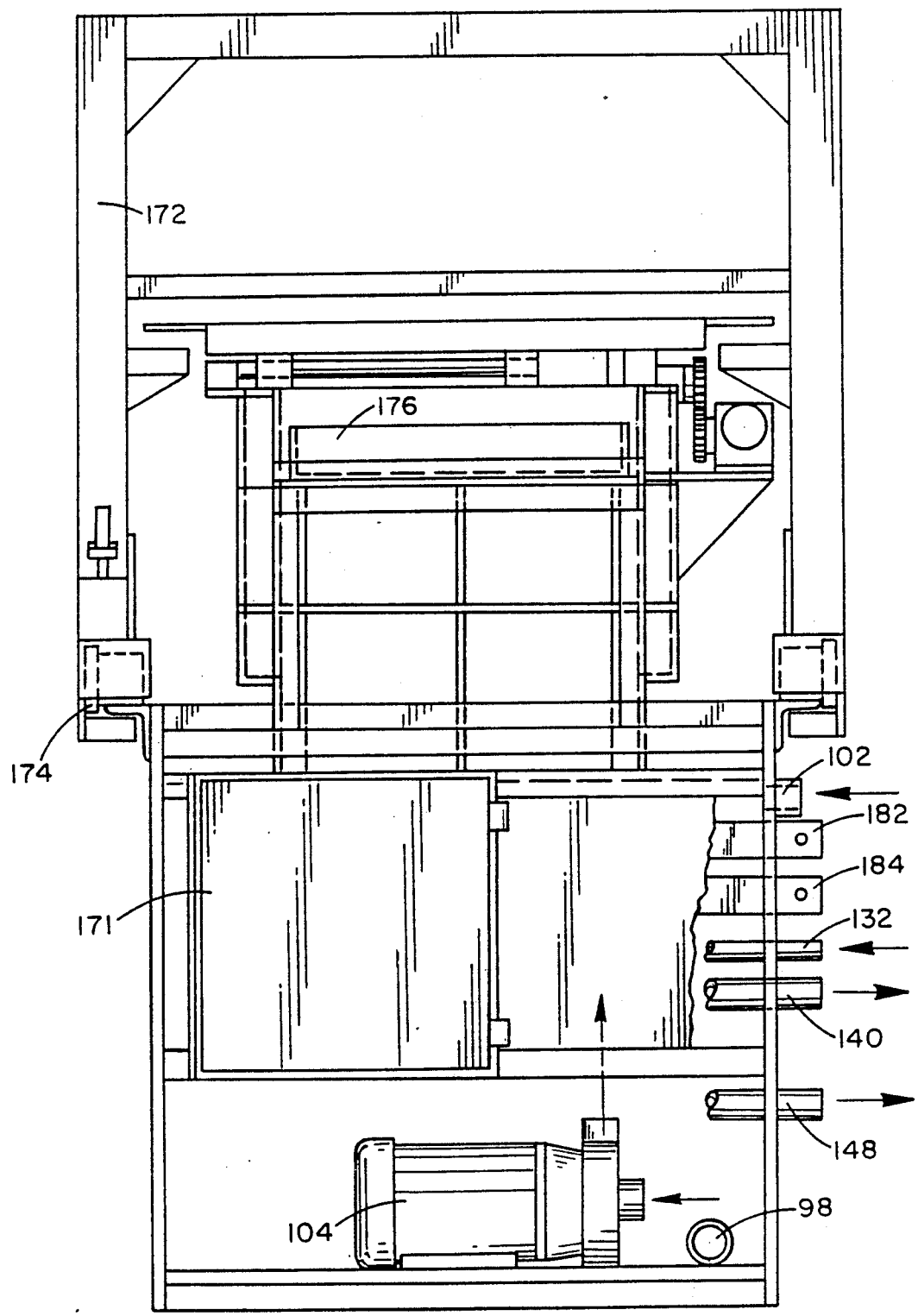
FIG. 2 is an end elevational view of the apparatus of FIG. 1.

Providing electricity to the apparatus is an anode bus 182 and a cathode bus 184 as shown in FIG. 2. The anode bus is in electrical contact with a preferably copper anode connection block, including the upper frame member 64 illustrated in FIGURE 6, in order to conduct electricity to the wire grids 60 of the anodes 14. To establish electrical contact between the cathode bus 184 and the rotating barrels 12 a rotating cathode contact 188 is provided, as shown in FIG. 4. Adjacent thereto is a mating tank contact 190, preferably also made of copper, which is attached to a top rim flange of the tank and is mechanically fastened to the cathode bus 184. These electrical contacts are conventional.

It is expected that a steady current will be utilized for the process rather than square wave current pulses, which would allow one to "pulse plate", simply due to the increased cost of a rectifier which would produce square waves, as opposed to a rectifier which produces steady current.

It is anticipated that the unit will be constructed of stainless steel, polypropylene and schedule 80 plumbing for industrial applications. It is anticipated that down time for the equipment will be virtually eliminated by effortless cathode maintenance, long-life anodes and the ease of cleaning the unit. It is also anticipated that the rectifier will be spaced from the system in order to be located in a non-corrosive environment for extended life. It is further anticipated that the rectifier will, as is conventional, be convection cooled and have thermal overload protection.

The modular design of the unit disclosed herein allows expansion of the system. In other words, the user could initially begin with a single cell system to meet present needs and expand the system as requirements increase. The expandable nature of this apparatus will allow the user to add an additional cell in the tank simply by increasing the size of the rectifier being utilized. For systems which require more than three cells, an additional three cell unit can be added in series with the first unit. This will allow the hoist on the primary system to also service the additional plating cells of the second unit.

With reference now again to FIG. 1, the process runs as follows. Waste metallic solution is pumped into the lower solution reservoir 90 through the inlet pipe 102. It is anticipated that approximately 250 gallons of waste metallic solution can be processed at one time by the apparatus disclosed herein. Of that amount, about two-thirds is held in the reservoir 90 with the other third being held in the tank 10 and any given time. The solution is then pumped by the pump 104 into the various cells 13 of the tank 10 through the first, second, third and fourth inlets 16, 18, 20 and 22 of each cell. As direct current is applied to the anode and cathode, the waste metallic solution is electrolytically charged so that recovery of cationic metal species from the solution occurs in the rotating cathode barrel 12 and on the medium 30. The solution then flows out of the barrel through the perforations 44 and out of the tank 10 through the perforations 76. The solution then flows into the drain gutter 80 through the drain pipe 82, through the filter bag 92, over the weir assembly 94 and into the lower solution reservoir 90.

From there, the fluid again flows out of the reservoir through the outlet pipe 100 and is pressurized again by the pump 104 so that it can again cycle through the tank 10. It is anticipated that numerous cycles will be necessary for the waste solution to be sufficiently purified so that it can be disposed of through the drain line 142. In other words, the solution will be processed in the unit for a number of hours. However, the high operating efficiency of this unit permits a rapid reduction of the metal from the process solution and thereby a reduction of the operating cost for final metal removal.

A suitable conventional test such as a titration test, run with a wet type test kit, or an analytical test run with, e.g., an atomic absorption unit, can be performed on the waste solution to ascertain how many parts per million of waste metal are still contained in the solution. It is contemplated that the apparatus disclosed herein is capable of reducing the waste metal parts per million in the solution down to approximately 10 ppm, using the medium disclosed above. However, the use of, e.g., steel wool as the medium could reduce the ppm level to approximately 1 ppm. It is also contemplated that the waste solution flowing in through pipe 102, the solution meant to be cleansed originally, can initially have up to 20,000 parts per million of waste metal, e.g., 20 grams per liter.

It is not anticipated at this point that it will be necessary to add catalysts to the waste solution to promote the plating out of metals, however, that may be necessary for certain solutions and certain metals. It is believed that the sizeable currents flowing through the process solution will heat that solution substantially. Accordingly, it may be necessary to provide cooling coils (not illustrated) in the reservoir 90 in order to cool the process solution between its trips to the cathode barrel or barrels. Such cooling coils would be connected to a temperature sensor (not illustrated) located in the reservoir 90 and hooked-up to a circuit so that the cooling coils would be activated whenever an over temperature condition would be sensed in the solution residing in the reservoir.

Once the solution has been cleansed down to approximately 10 ppm, as verified by one of the tests mentioned above, it is allowed to flow out through the pipe 142. Depending on the pH of the solution and the purity level required for the municipal sewer line, the solution could then be put through a conventional ion exchange device (not illustrated) or be neutralized by way of pH adjustments before entering the sewer lines. Other types of further treatment of the waste solution are also possible.

It should be appreciated that the recovery unit disclosed herein will extend the life of a regenerant solution used in an ion exchange water treatment system by removing the metals and deposits from the regenerant solution in solid form. The system also reduced plating bath dumps and decants that are normally sent out for disposal by depositing the metal in solid form on the medium. Accordingly, the system reduces or eliminates the cost for disposal of hazardous materials by removing the metals held in solution.

Once the medium, i.e., the shots, bolts, etc., is coated with the waste metal, then that metal can be recovered through conventional recovery techniques, depending on the composition of the metal. Generally speaking, nickel, copper, lead and the like go to standard recycling operations. On the other hand, some metals such as chromium may need to be disposed on in a dump or the like, due either to the fact that they cannot be recovered or due to the fact that it would be uneconomical for the metal to be recovered because of the low value that the recovered metals have. It is advantageous to have an inexpensive recoverable cathode medium with a high metal holding capacity. This allows the avoidance of expensive stripping processes to reclaim the metals from the cathode. In addition, this type of medium would facilitate reusable or reclaimable cathode medium. The high metal holding capacity of the cathode medium would extend the time intervals between the media replacement.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. An apparatus for recovering metals from waste metallic solutions, comprising:
   a treatment tank;
   a hollow perforated cathode element rotatably mounted in said treatment tank for holding associated workpieces which are to be coated with the recovered waste metal;
   a fixed anode element extending in said treatment tank in spaced relation to said rotatable cathode element;
   a first solution inlet conduit extending into said rotatable cathode element;
   a second solution inlet conduit extending into said treatment tank in a manner spaced from said rotatable cathode element; and,
   a drain conduit leading away from said treatment tank, said second solution inlet conduit being located between said drain conduit and said hollow perforated cathode element.

2. The apparatus of claim 1 further comprising:
   a plurality of drain holes located at the bottom of said treatment tank; and, a sloping drain gutter leading from said drain holes to said drain conduit.

3. The apparatus of claim 1 further comprising:
a solution reservoir located below said treatment tank and in communication with said drain conduit, said reservoir having an inlet and an outlet;
a filtration assembly positioned at said solution reservoir inlet; and,
wherein a bottom wall of said reservoir slopes towards said outlet.

4. The apparatus of claim 3 further comprising a pump communicating with said solution reservoir outlet, through a first line, and with said first and second solution inlets, through a second line.

5. The apparatus of claim 4 further comprising:
a first means for sensing a high solution level in said reservoir; and,
a second means for sensing a low solution level in said reservoir.

6. The apparatus of claim 4 further comprising:
a third, untreated solution inlet, line communicating with said reservoir; and,
a fourth, treated solution outlet, line communicating with said reservoir outlet and inlet of said pump.

7. The apparatus of claim 1 further comprising a cathode contact element extending into said hollow rotatable cathode element so as to contact the associated medium held in said hollow rotatable cathode element.

8. The apparatus of claim 1 wherein said anode element comprises:
a vertical frame member;
a horizontal frame member; and,
an anode grid held by said vertical and horizontal frame members.

9. The apparatus of claim 8 wherein said anode element is J-shaped in side view.

10. Apparatus for recovering metal from waste solutions containing metal, comprising:
a treatment tank for holding the waste solution;
a plating barrel for holding associated workpieces onto which the metal will plate, said plating barrel being perforated and being rotatably mounted within said treatment tank;
a cathode contact element extending into said plating barrel so as to contact the workpieces held therein;
a fixed anode element extending in said treatment tank in spaced relation to said plating barrel;
a first solution inlet conduit communicating with said plating barrel;
a drain conduit leading away from said treatment tank;
a solution reservoir in communication with said drain conduit and hence said treatment tank, said solution reservoir having an inlet and an outlet;
a filtration means communicating with said solution reservoir; and,
a circuit means for connecting said anode and cathode to a source of electric current.

11. The apparatus of claim 10 further comprising:
a plurality of drain holes located at the bottom of said treatment tank; and,
a drain gutter leading from said drain holes to said drain conduit.

12. The apparatus of claim 10 further comprising:
a pump communicating with said solution reservoir outlet, through a first line, and with said first solution inlet, through a second line;
a sensor means for sensing an overfill condition of solution in said reservoir; and,
a circuit means electrically connected to said sensor means to de-energize said pump when a signal is sent by said sensor means.

13. The apparatus of claim 10 wherein said first plating barrel is a first plating barrel and is located in a first cell in said tank and further comprising:
a second plating barrel located in a second cell of said treatment tank in a spaced manner from said first plating barrel; and,
a second anode located in said tank in spaced relation to said second plating barrel.

14. The apparatus of claim 10 wherein said anode element is J-shaped in side view and comprises:
a vertical frame member;
a horizontal frame member; and,
an anode grid held by said vertical and horizontal frame members.

15. The apparatus of claim 14 wherein two such anode elements are provided on each side of said plating barrel.

16. An apparatus for recovering metal from waste solutions containing metal, comprising:
an electrolyte tank;
a perforated container for holding associated workpieces which are to be coated;
a means for rotatably mounting said container in said tank;
a cathode contact element extending into said container for contacting the workpieces;
a first electrolyte circulating pipe extending into said container;
an anode element extending into said tank in spaced relation to said container;
a plurality of drain holes located at the bottom of said electrolyte tank;
a drain conduit leading away from said electrolyte tank; and,
a sloping drain gutter located under said drain holes and leading to said drain conduit.

17. The apparatus of claim 16 further comprising a second electrolyte circulating pipe extending into said electrolyte tank in spaced relation to said first circulating pipe and said container 18. The apparatus of claim 17 further comprising a pump having an inlet end operably connected with said drain gutter and having an outlet end connected with said first and second electrolyte circulating pipes.

19. The apparatus of claim 18 further comprising:
a third electrolyte circulating pipe extending into said container opposite said first circulating pipe; and,
a fourth electrolyte circulating pipe extending into said electrolyte tank in spaced relation to said third circulating pipe and said container.

20. The apparatus of claim 18 further comprising:
a solution reservoir located below said treatment tank and in communication with said drain conduit, said reservoir having an inlet and an outlet wherein said reservoir has a bottom wall which is slanted towards said outlet;
a high solution level sensor operatively connected to said reservoir; and,
a circuit means electrically connected to said sensor and said pump for de-energizing said pump upon a signal from said sensor.

21. The apparatus of claim 16 further comprising:

a second, high solution level sensor operatively connected to said container;
a warning means associated with said sensor; and,
a circuit means electrically connected to said sensor for activating said warning means upon a signal from said sensor.

22. The apparatus of claim 16 wherein said anode element comprises an anode grid held in a frame.

* * * * *